(12) United States Patent
Nathan et al.

(10) Patent No.: US 7,547,070 B2
(45) Date of Patent: Jun. 16, 2009

(54) SEAT FOLD ACTUATOR

(75) Inventors: John F. Nathan, White Lake, MI (US); H. Winston Maue, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 240 days.

(21) Appl. No.: 11/472,203

(22) Filed: Jun. 21, 2006

(65) Prior Publication Data

US 2007/0296257 A1    Dec. 27, 2007

(51) Int. Cl.
*B60N 2/22* (2006.01)

(52) U.S. Cl. .............................. 297/378.12; 296/65.17; 297/335

(58) Field of Classification Search ............ 297/378.12, 297/332, 335, 336, 363, 364, 365; 296/65.08, 296/65.09, 65.17
See application file for complete search history.

(56) References Cited

U.S. PATENT DOCUMENTS

| | | | | | |
|---|---|---|---|---|---|
| 3,515,433 | A | * | 6/1970 | Tabor | ........................ 297/374 |
| 3,801,155 | A | * | 4/1974 | Hodgen et al. | ............. 297/374 |
| 3,958,828 | A | * | 5/1976 | Ishida et al. | ............. 297/361.1 |
| 4,049,293 | A | | 9/1977 | Bouju | |
| 4,314,729 | A | * | 2/1982 | Klueting | .................... 297/366 |
| 4,392,557 | A | | 7/1983 | Franke | |
| 4,548,092 | A | | 10/1985 | Strong, Jr. | |
| 4,875,735 | A | * | 10/1989 | Moyer et al. | ................ 297/367 |
| 5,383,699 | A | * | 1/1995 | Woziekonski et al. | .... 296/65.09 |
| 5,433,507 | A | * | 7/1995 | Chang | ........................ 297/367 |
| 5,622,410 | A | * | 4/1997 | Robinson | .................... 297/367 |
| 5,685,610 | A | * | 11/1997 | Minai | ........................ 297/364 |
| 5,733,008 | A | | 3/1998 | Tame | |
| 5,771,742 | A | | 6/1998 | Bokaie et al. | |
| 6,019,430 | A | * | 2/2000 | Magyar et al. | .............. 297/367 |
| 6,086,097 | A | | 7/2000 | Van Wynsberghe | |
| 6,561,584 | B1 | * | 5/2003 | Schwarz et al. | ............. 297/367 |
| 6,793,285 | B1 | * | 9/2004 | Tame | ......................... 297/336 |
| 6,857,703 | B2 | * | 2/2005 | Bonk | .................... 297/378.14 |
| 6,910,714 | B2 | | 6/2005 | Browne et al. | |
| 6,910,739 | B2 | * | 6/2005 | Grable et al. | .......... 297/378.12 |
| 7,032,973 | B2 | * | 4/2006 | Reubeuze | ............. 297/378.13 |
| 2001/0000617 | A1 | | 5/2001 | Tracy | |
| 2002/0121784 | A1 | | 9/2002 | Chevalier | |
| 2002/0135196 | A1 | | 9/2002 | Bingle et al. | |
| 2002/0145315 | A1 | | 10/2002 | Fraley et al. | |

(Continued)

FOREIGN PATENT DOCUMENTS

EP    1138547 A1    10/2001

(Continued)

OTHER PUBLICATIONS

Lewis Research Center, Cleveland, Ohio, Latch-Release Pin Puller With Shape-Memory-Alloy Actuator, PennEngineering, Fastening Technologies, http://www.nasatech.com/Briefs/Feb98/LEW16511html.

(Continued)

*Primary Examiner*—David Dunn
*Assistant Examiner*—Patrick Lynch
(74) *Attorney, Agent, or Firm*—Brooks Kushman P.C.

(57) ABSTRACT

An actuator configured to actuate a member. The actuator optionally including capabilities for storing and releasing kinetic energy. The actuator being suitable for use in any number of environments, including but not limited to facilitating seat folding operations.

3 Claims, 5 Drawing Sheets

U.S. PATENT DOCUMENTS

| | | |
|---|---|---|
| 2003/0038517 A1 | 2/2003 | Moran et al. |
| 2004/0124684 A1* | 7/2004 | Bonk .................. 297/378.12 |
| 2005/0116493 A1 | 6/2005 | Falchero et al. |
| 2005/0183235 A1 | 8/2005 | Markl |
| 2005/0218710 A1 | 10/2005 | Browne et al. |
| 2006/0138844 A1* | 6/2006 | LaVoie et al. .......... 297/378.12 |

FOREIGN PATENT DOCUMENTS

| | | | |
|---|---|---|---|
| WO | 2004005067 A1 | 1/2004 | |
| WO | WO 2005/112247 A2 | 11/2005 | |

OTHER PUBLICATIONS http://www.tiniaerospace.com/images/pinpullerconcept.gif.

Great Britain Search and Examination Report for Application No. GB0711978.7, mailed Oct. 22, 2007, 6 pages.

* cited by examiner

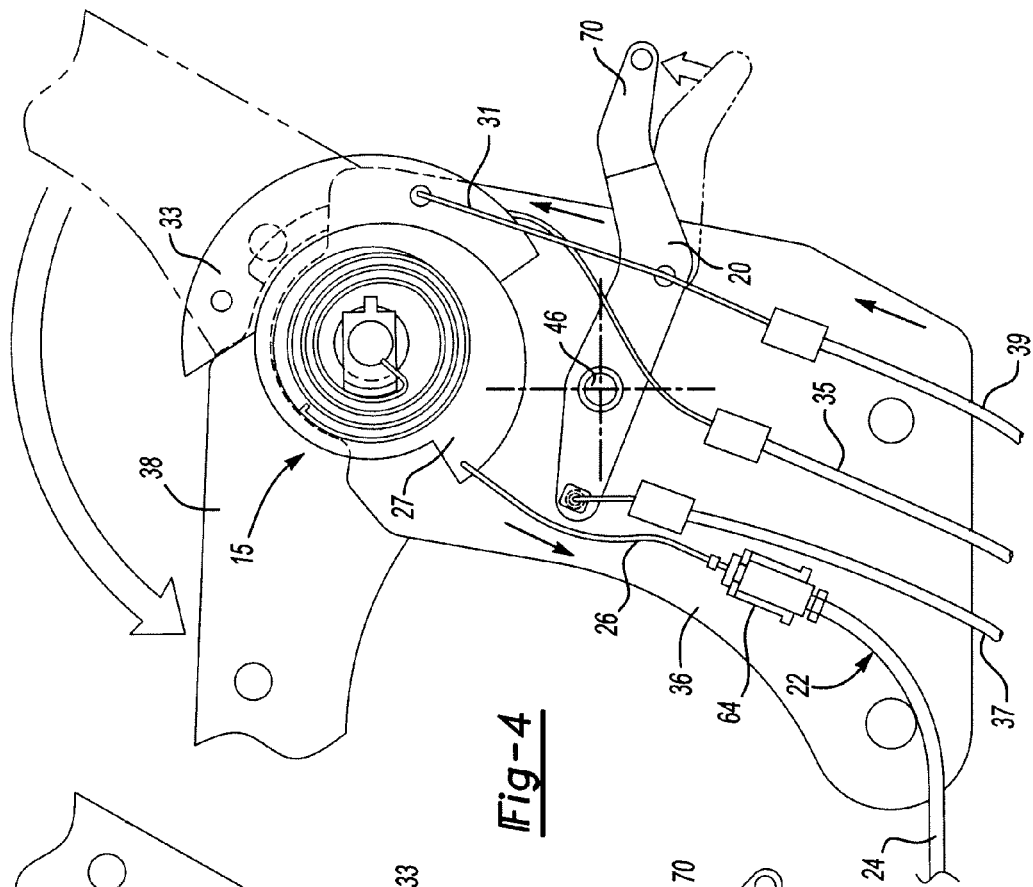
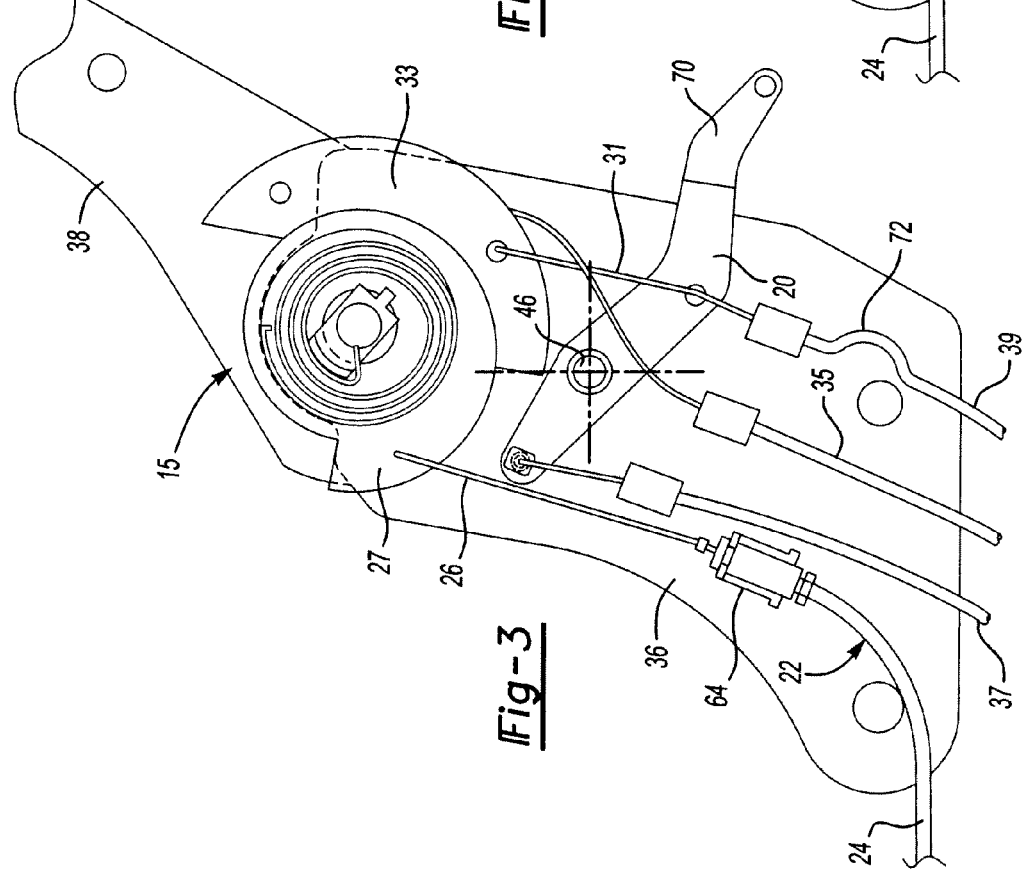

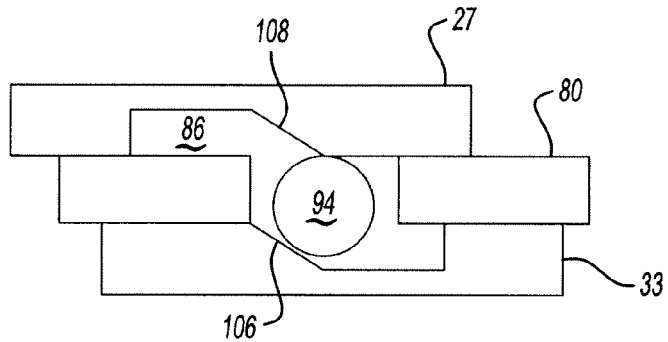
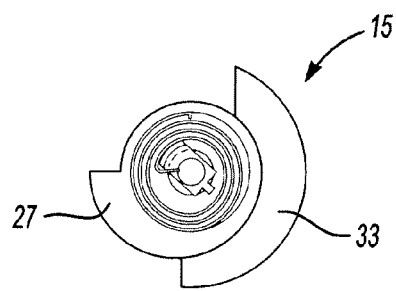
Fig-7A          Fig-7B
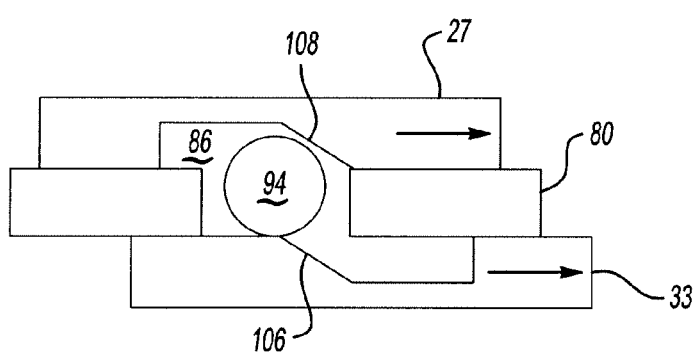
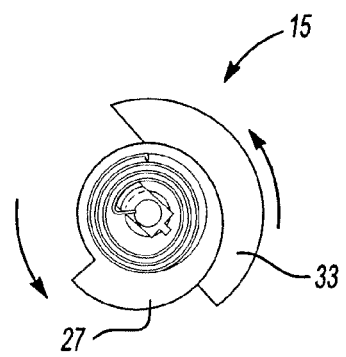
Fig-8A          Fig-8B
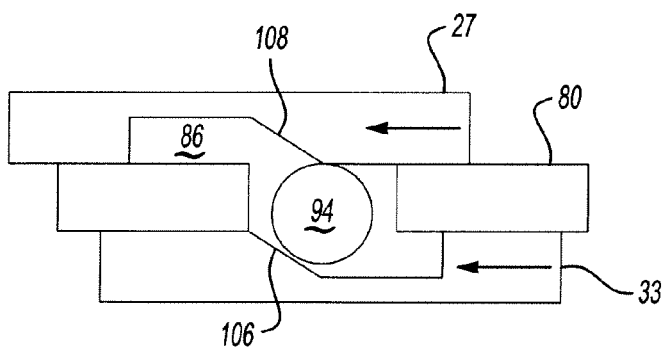
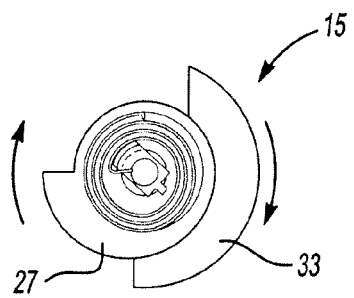
Fig-9A          Fig-9B

# SEAT FOLD ACTUATOR

BACKGROUND OF THE INVENTION

1. Field of the Invention

The present invention relates to seat fold actuators.

2. Background Art

Actuators and triggers are devices that cause an apparatus to operate. Latches are devices that are used to grasp or lock an object, as with a catch and a lever, or the like. An actuator may be used to release or engage a latch. Some actuators may be remotely connected to a latch to allow for operation of the latch from a distance.

Latches are used in a wide variety of applications. For example, latches may be provided as a part of a machine, on building doors or windows, or in vehicles. Latches that can be reset have the advantage that they can be used repeatedly. One way to provide a latch that can be reset is to provide an actuator that operates a motor and gear reducer to release the latch by forward rotation of the motor and reset the latch by reverse rotation of the motor. While this approach is effective, the cost of a motor and gear reducer may be uneconomical in many applications.

In some applications, it may be desirable to provide a manual actuator and a power actuator for a latch that may be alternatively used to operate the latch. Dual mode actuators may be provided to allow a latch to be manually operated or power operated. One problem with such dual actuation latches is that one mode of actuation may interfere with the other mode. In addition, resetting the dual mode actuator may be complicated if both modes of actuation are not accommodated by the reset mechanism.

One exemplary application for a dual mode remotely actuated latch is a vehicle seat back folding apparatus. Vehicle seat backs may be folded over the seat base to facilitate ingress and egress. Prior art actuators have been developed that use a motor that drives a gear reducer in one direction to release a latch and driven in the opposite direction to reset the actuator for reuse after the latch is engaged. Seat folding latches may also be specified to be manually actuated in the event that a user wishes to operate the latch manually or if power is not available for the power actuation system. While these types of systems have been developed, the cost of the motor and gear reducer may make such systems uneconomical.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates a trigger assembly in more detail in accordance with one non-limiting aspect of the present invention;

FIG. 4 illustrates a folded over seat position in accordance with one non-limiting aspect of the present invention;

FIGS. 7a-9b illustrate operation of the trigger assembly in accordance with one non-limiting aspect of the present invention.

DETAILED DESCRIPTION OF THE PREFERRED EMBODIMENT(S)

Figure 1:
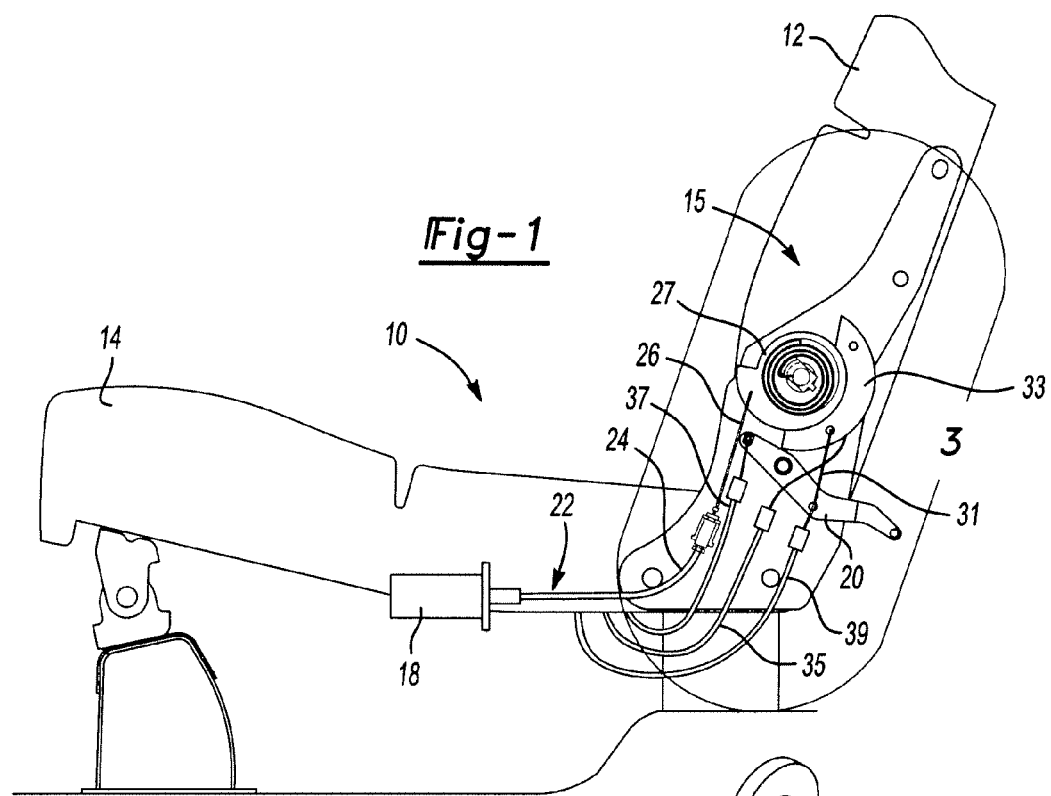
FIG. 1 illustrates a vehicle seat in accordance with one non-limiting aspect of the present invention.

Referring to FIG. 1, a vehicle seat 10 is illustrated that has a seat back 12, a seat base 14, and a trigger assembly 15. An actuator 18 is illustrated as being attached to the seat base 14. However, it should be understood that the actuator 18 could be secured to another location on the vehicle or seat support structure. A latch lever 20 is connected to the actuator 18 by a Bowden cable 22, or link. The Bowden cable 22 includes a sleeve 24 that encloses a wire 26 so that the wire 26 is axially moveable relative to the sleeve.

The wire 26 connects to a trigger plate 27 such that actuation of the wire 26 in the downward direction causes the trigger plate 27 to move in a counter-clockwise direction and to over come spring biasing provided by a chaser spring 29 in an opposite, locking direction. A power plate wire 31 connects a power plate 33 to the latch lever 20 such that a power plate spring 25 instigates counter-clockwise rotation of a power plate 33 in an actuation direction in order to cause the latch lever 20 to pivot in similar counter-clockwise manner about pivot 46. A reset wire 35 connects to power plate 31 and can be tensioned with rotation of the seat back 14 in order to facilitate resetting the power plate 33, as described below in more detail.

First and second mirroring wires 37 and 39 actuate mirroring features on an opposite side of the seat 10 so as to perform mirroring operations associated with actuating a mirroring latch lever (not shown). The mirroring operations essentially facilitate releasing the opposite side of the seat in a manner similar to the illustrated side of the seat, but optionally without a second trigger assembly 15.

Figure 2:
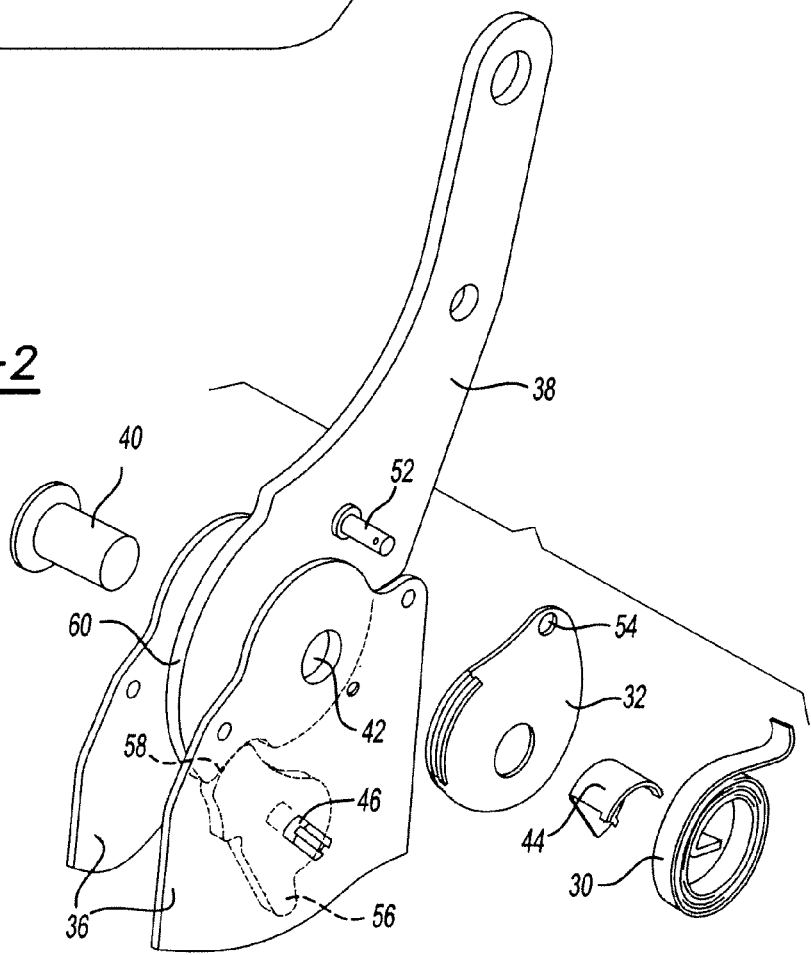
FIG. 2 illustrates one way of connecting a seat back to a seat base in accordance with one non-limiting aspect of the present invention.

Referring to FIG. 2, one type of hinge mechanism is shown in greater detail in an exploded perspective view that shows one way of connecting the seat back 12 to the seat base 14. It should be understood that other types of hinge mechanisms may be adapted to include the latch actuator system of the present invention. A pair of seat base plates 36 are connected to a seat back support bracket 38 by means of a pivot pin 40. Pivot pin 40 is received in a hole 42 that extends through the seat base plates 36, seat back support bracket 38 and bracket 32. A spring bracket 44 retains seat spring 30 and interconnects the seat spring 30 to the pivot pin 40. The latch lever 20 shown in FIG. 1 is connected to a lever pivot pin 46.

The latch lever 20 is secured to the lever pivot pin 46 which is in turn secured to a latching follower 56. The seat back support bracket 38 includes a step 58 that is engaged by the latching follower 56 when the seat is in its latched position. After the seat is unlatched, the latching follower 56 follows an arcuate cam surface 60 on the support bracket 38 as the support bracket 38 pivots about pivot pin 40 into a position where a seat back 12 is folded over the seat base 14.

Referring now to FIGS. 3-4, the trigger assembly 15 is described with reference to the embodiment of the invention described above with reference to FIGS. 1 and 2. FIG. 3 is an enlarged illustration of a portion of the apparatus described with reference to FIG. 1 that is within the oval denoted FIG. 3 in FIG. 1. In FIG. 3, the apparatus is shown in its latched condition with the seat back support bracket 38 held in a vertical, rearwardly inclined orientation and is fixed relative to the seat base plates 36. In this position the latch lever 20 is in its retained position.

A cable sleeve bracket 64 secures the sleeve 24 to seat base 14 or other supporting structure. A handle 70 is provided at the opposite end of the latch lever 20 from the cable sleeve bracket 64. The handle 70 is intended to be grasped directly or indirectly by a person for manually manipulating the latch lever 20. The latch is lifted to cause the latching follower 56 to clear the step 58 and seat back 12 to move forwardly with the force applied by the seat spring 30, thereby allowing the seat back 12 to rotate to a folded over position as the latching follower 56 follows the arcuate cam surface 60.

While not shown, the handle 70 may be provided with an enlarged handle cover to make the handle 70 easier to grasp and to provide a finished appearance. As shown in FIG. 3, a slack portion 72 may be provided in the wire 39 to allow the handle 70 to be easily lifted without encountering resistance from the seat spring 30 mirroring element (not show) to which the wire 39 is connected. The extent of slack is somewhat exaggerated as shown for illustrative purposes.

Referring to FIG. 4, actuation of the latch 20 is illustrated in either a manual or power mode. In the manual mode the lever 20 may be manually grasped and moved from the position shown in phantom lines to the position shown in solid lines. When the latch lever 20 is lifted, the latching follower 56 disengages the step 58 as previously described. Alternatively, the latch may be power actuated upon triggering the actuator 18. The actuator 18 may comprise a shape memory alloy trigger, a solenoid or other actuator that is capable of exerting a tensioning force on wire 26. In the embodiment illustrated in FIG. 4 the actuator 18 exerts a pulling force on the cable that pulls the trigger plate 27 in a counter-clockwise direction. This movement causes the trigger assembly 15 to move from a loaded position to a fired position wherein the trigger plate 27 triggers the power plate 33 to pull upwardly on the wire 31, which thereby pulls upwardly on the latch lever 20 to actuate the latch lever 20 from the retained position to the released position.

When the lever actuator 20 is rotated about the pivot pin 46 from the retained position to the released position the latching follower 56 disengages the step 58 as previously described. When the latching follower 56 clears the step 58 the seat back support bracket 38 moves from the position shown in phantom lines in FIG. 4 along the curved arrow path to the position shown in solid lines in FIG. 4. The seat spring 30 drives the seat back 12 and its associated support bracket 38 into the folded over position.

Figure 5:
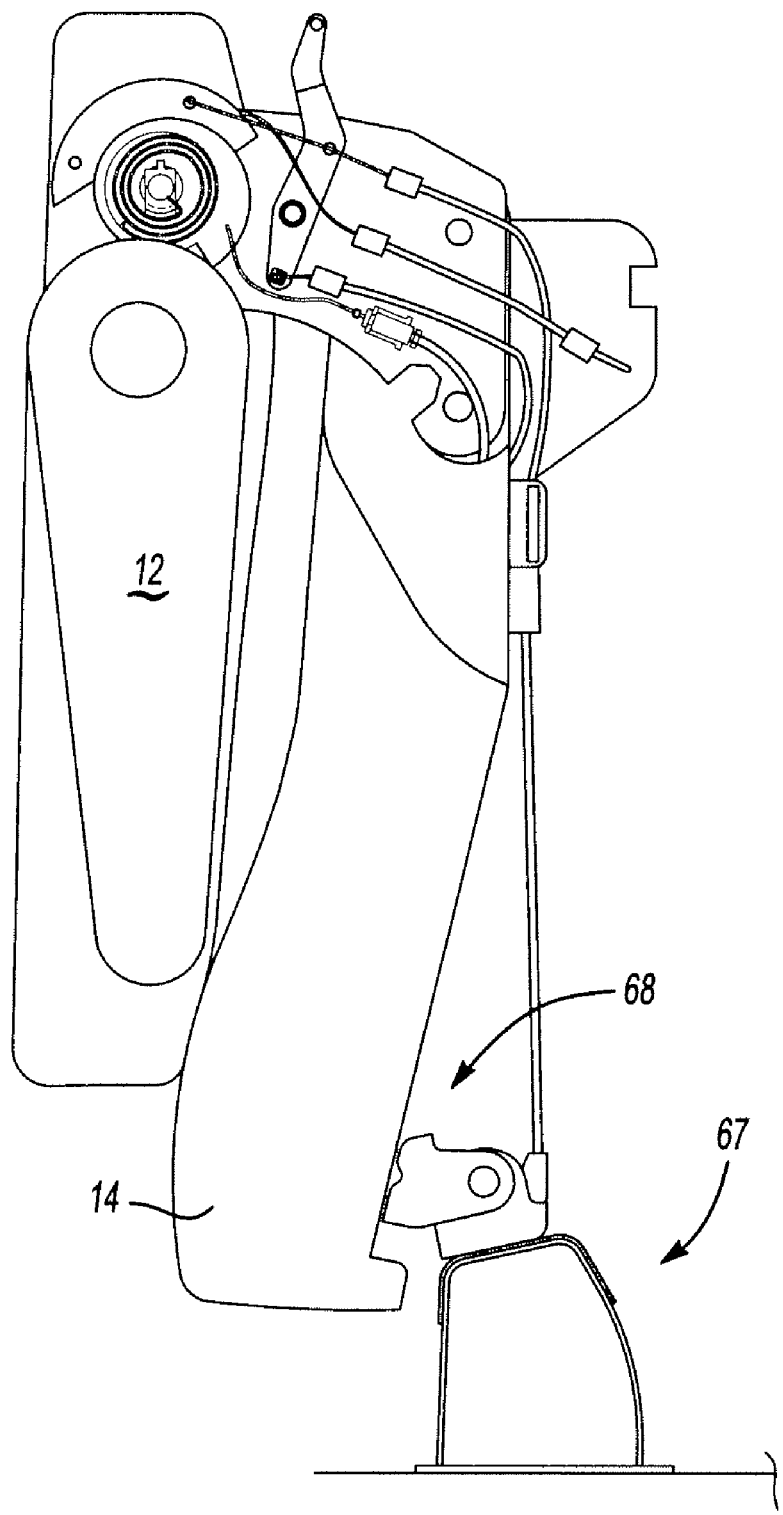
FIG. 5 illustrates a flipped forward seat position in accordance with one non-limiting aspect of the present invention.

Optionally, as shown in FIG. 5, the seat 10 may automatically flip forward to the illustrated stadium seat position (folded forward position) once the seat back 12 reaches the folded over position. A seat base actuator system 67, or other arrangement, may be included to facilitate such movement. The seat base actuator system 67 may include a cable or other feature (not shown) connected to the seat back 12, support 38, or other feature in the system 10 such that actuation of the seat back 12 to the folded down position allows the seat base actuator system 67 to then flip the seat back 12 and seat base 14 to the stadium or flipped forward position shown in FIG. 5.

As the seat back 12 folds to or is folded up from the folded position (fold flat, flipped forward, etc.), the reset cable 35 tightens from its slack position to rotate the power plate 33 from its released position (FIG. 4) to its loaded position (FIG. 3). This movement resets the trigger assembly 15 such that the power plate 33 is loaded and ready to trigger rotation of the lever latch 20 in response to triggering of the trigger plate 27. A reset mechanism 68 may be included on the seat base actuator system 67 to facilitate tensioning the reset cable 35 or some other mechanism may be similarly employed.

Figure 6:
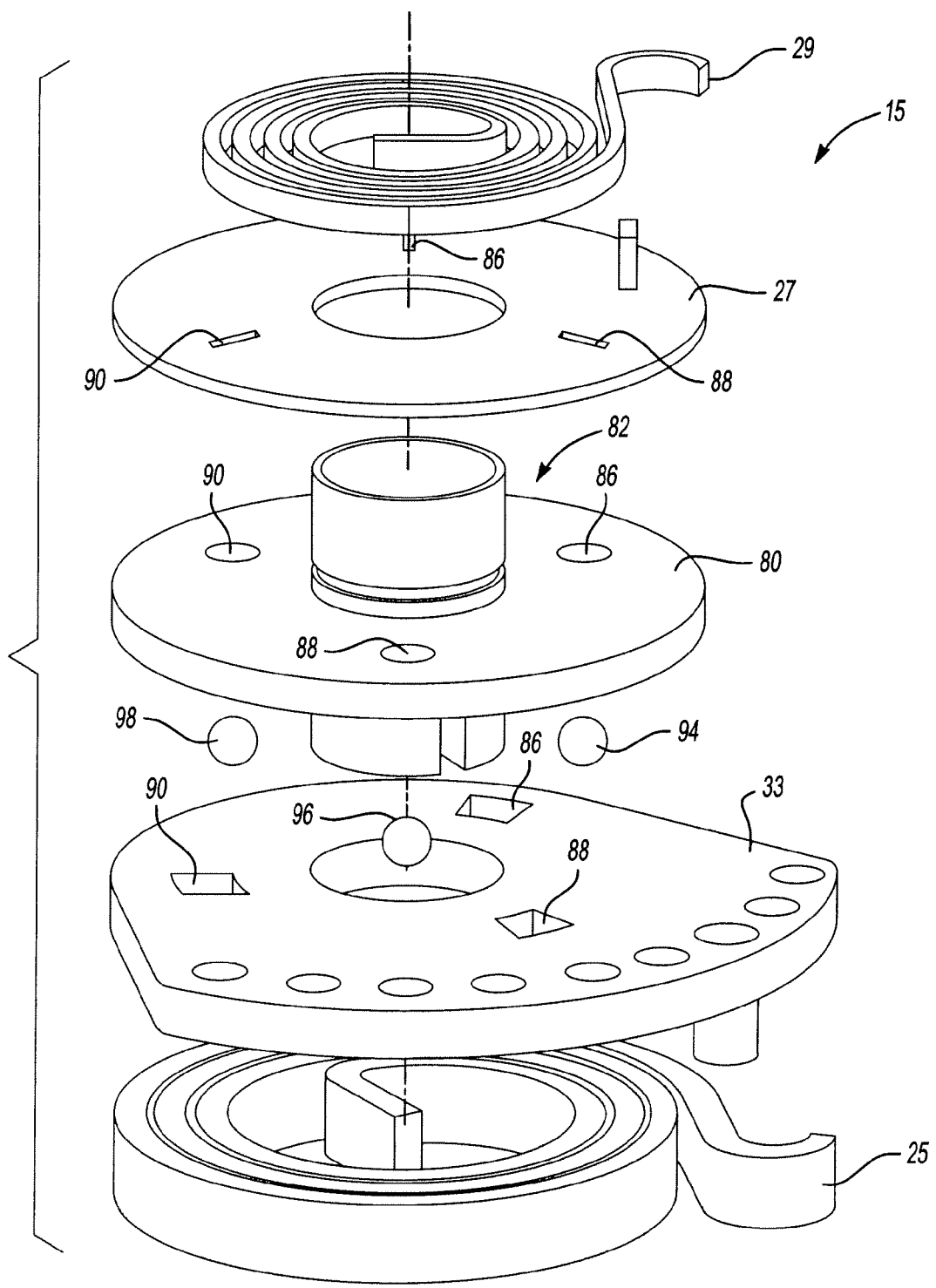
FIG. 6 illustrates an assembly view drawing of the trigger assembly in accordance with one non-limiting aspect of the present invention.

FIG. 6 illustrates an assembly view drawing of the trigger assembly 15 in accordance with one non-limiting aspect of the present invention. The trigger assembly 15 may include the trigger plate 27 on one side of a reference plate 80 and the power plate 33 on an opposite of the same such that both plates are configured to rotate coaxially about a central portion 82 of the reference plate 80. Each of the reference plate 80, trigger plate 27, and power plate 33 may include common apertures 86-90 for receiving a ball bearing 94-98. The apertures 86-90 on each plate may be arranged relative to each other such that they cooperate to control actuation of the trigger assembly 15 from the loaded to fired positions.

A chaser spring 29 may be attached to the reference plate 80 and the trigger plate 27 such that the chaser spring 29 causes the trigger plate 27 to rotate in a clockwise direction relative to the reference plate 80. A power spring 102 may be attached to the reference plate 80 and the power plate 33 such that the power plate spring 25 causes the power plate 33 to rotate in a counter-clockwise direction relative to the reference plate 80. As described below in more detail, the counter-clockwise rotation of the power plate spring 25 may be used to actuate the power plate 33 and the connected latch lever 20 from the retained position (loaded position) to the released position (fired position). Similarly, the clockwise rotation of the chaser spring 29 may be used to return the trigger plate 27 from the fired position to the loaded position.

FIGS. 7a-9b illustrate the interaction of ball bearing 94 with one of the corresponding apertures 86 in accordance with one non-limiting aspect of the present invention. FIGS. 7a-7b relate to the loaded position, FIGS. 8a-8b relate to the fired position, and FIGS. 9a-9b related to returning from the fired to loaded position. The loaded position includes the trigger assembly 15 storing kinetic energy associated with a cocked or otherwise flexed power plate spring 25 such that the ball bearing 94 is disposed partially within the aperture 86 of the power plate 33 such that the power plate 33 is unable to move in the counter-clockwise direction. The fired position relates to the releasing of the stored energy and the counter-clockwise rotation of the power plate 33, i.e., the releasing of the power plate spring 25 to rotate the power plate 33 and thereby actuate the latch lever 20.

From the loaded position, the fired position may be obtained with movement of the trigger plate 27 in a counter-clockwise direction, such as with actuation of the trigger wire 26. This movement aligns the aperture 86 of the trigger plate 27 with the corresponding aperture 86 of the reference plate 80. Because the power plate 33 is under force from the power plate spring 102, the power plate is urged against the ball bearing 94 such that once the trigger plate 27 is aligned with the reference plate 80, the ball bearing 95 travels along an incline 106 and into the apertures 86 of the reference plate 80 and trigger plate 27, thereby freeing the power plate 33 to move in the counter-clockwise direction, which as described above actuates the latch lever 20 from the retained position to the released position.

From the fired position, and once tensioning on the trigger wire 26 is removed or decreased below the force of the chaser spring 29, the chaser spring 29 forces the trigger plate in a clockwise direction such that an incline 108 on the trigger plate 27 forces the ball bearing 94 in a downward direction, once the power plate 33 is properly aligned to receive the ball bearing 94. The power plate 33 may receive the ball 94 if it is reset, i.e., returned to the positioning shown in FIG. 7a that permits the ball bearing 94 to be disposed within a portion of the power plate 33. The power plate 33 may be reset in any manner, including tensioning or other tightening of the reset wire 35, such as by the flipping of the seat back 14 and/or seat base 12 described above.

In the illustrated embodiments, the seat backs 12 are disclosed as examples. The seat back may be more generically referred to as a latched member. Other types of latched members may include a seat base, a combination of a seat base and seat back, a headrest, a flat screen video display, a compartment cover, a glove box door, a hood, a deck lid, a seat back tilt adjustment armature, and the like. Another example in which more than one latched member is controlled by the latch and trigger is that of a seat back that folds over a seat base, and then the folded over seat is tumbled forward for storage, ingress, and egress. With any of those arrangements the trigger is electrically actuated and a movement of the latched member is executed to reset the trigger.

As required, detailed embodiments of the present invention are disclosed herein; however, it is to be understood that the disclosed embodiments are merely exemplary of the invention that may be embodied in various and alternative forms. The present invention fully contemplates its application in any number of environments, including those associated with U.S. patent application Ser. No. 11/278,295, filed Mar. 3, 2006, the disclosure of which is hereby incorporated in its entirety. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
    a seat base;
    a seat back;
    a seat spring configured to rotate the seat back from an upright position to a folded position relative to the seat base;
    a latch having a released position and retained position, the retained position corresponding with retaining the seat back in the upright position and the released position corresponding with permitting the seat spring to rotate the seat back to the folded position; and
    a trigger assembly configured to actuate the latch from the retained position to the released position so as to control movement of the seat back from the upright position to the folded position, wherein the trigger assembly is connected to the latch and actuatable from a loaded position to a fired position, the loaded position corresponding with the trigger assembly preventing release of kinetic energy stored within the trigger assembly and the fired position corresponding with releasing the stored kinetic energy, wherein the releasing of the stored kinetic energy causes the trigger assembly to actuate the latch from the retained position to the released position;
    wherein the trigger assembly comprises:
        a reference plate having one or more apertures for receiving a ball bearing;
        a trigger plate configured to rotate about one side of the reference plate;
        a power plate connected to the latch and configured to rotate about an opposite side of the reference plate;
        a chaser spring connected to the reference plate and the trigger plate, the chaser spring configured to rotate the trigger plate in a locking direction;
        a power spring connected to the reference plate and power plate, the power spring configured to rotate the power plate in an actuation direction so as to actuate the latch from the retained position to the released position;
    wherein each of the trigger plate and power plate include apertures corresponding with the apertures of the reference plate such that ball bearings received within the apertures are free to move therebetween;
    wherein the apertures in the trigger plate and power plate each include an incline to force at least part of the ball bearings out of the apertures of the same;
    wherein the trigger plate and power plate are moveable between loaded and fired positions, the loaded position corresponding with the ball bearings being positioned within the apertures such the ball bearings are located within a portion of the apertures of the power plate that prevents the power spring from rotating the power plate in the actuation direction, the fired position corresponding with the ball bearings traveling along the incline of the apertures of the power plate to a position within the apertures of the trigger plate that permits the power spring to rotate the power plate in the actuation direction; and
    wherein the chaser spring rotates the trigger plate in the locking direction from the fired position to the loaded position such that the ball bearings travel along the incline of the apertures of the trigger plate to the position within the apertures of the power plate that prevents the power spring from rotating the power plate in the actuation direction if the power plate is reset.

2. The vehicle seat of claim 1 further comprising a trigger wire connected to the trigger plate and an electrically operable actuation device configured for tensioning the trigger wire wherein tensioning of the trigger wire actuates the trigger assembly from the loaded position to the fired position, and thereby, actuation of the latch from the retained position to the released position.

3. The vehicle seat of claim 2 wherein tensioning of the trigger wire rotates the trigger plate against the force of the chaser spring when the trigger plate is in the loaded position such that the apertures of the trigger plate align with the apertures of the reference plate and force applied to the ball bearings by the power plate spring together cooperate to cause the ball bearings to travel from the loaded position to the fired position, and thereby, permit the power spring to rotate the power plate in the actuation direction to cause the latch to actuate from the retained position to the released position.

* * * * *